United States Patent [19]
Clark, Jr. et al.

[11] Patent Number: 5,785,913
[45] Date of Patent: Jul. 28, 1998

[54] METHOD OF MAGNETICALLY FORMING A PARTICLE FILLED POLYMER HAVING ENHANCED MATERIAL CHARACTERISTICS

[75] Inventors: William G. Clark, Jr., Murrysville Boro; William A. Byers, Penn Hills Township, both of Pa.

[73] Assignee: Westinghouse Electric Corporation, Pittsburgh, Pa.

[21] Appl. No.: 655,794

[22] Filed: May 30, 1996

[51] Int. Cl.$^6$ .................................................. B27N 3/02
[52] U.S. Cl. ...................... 264/109; 264/349; 156/272.4
[58] Field of Search ................................. 264/109, 349; 156/272.2, 272.4

[56] References Cited

U.S. PATENT DOCUMENTS

| | | |
|---|---|---|
| 3,427,264 | 2/1969 | Forster et al. . |
| 4,024,318 | 5/1977 | Forster et al. . |
| 4,559,373 | 12/1985 | Guthrie et al. . |
| 4,575,432 | 3/1986 | Lin et al. . |
| 4,762,864 | 8/1988 | Goel et al. . |
| 4,774,265 | 9/1988 | Ugelstad et al. . |
| 4,960,651 | 10/1990 | Pettigrew et al. . |

OTHER PUBLICATIONS

Vibrating Iron Particles To Sound Out Problems, ENR/Jul. 13, 1989.
Tagging Lets You Test Untestable, Advanced Materials & Processes Apr. 1990.
Polymer–Anchored Metal Oxide Particles, Karen L. Hassett, Linda C. Stecher, and David N. Hendrickson, Reprinted from Inorganic Chemistry, 1980, 19, 416.

*Primary Examiner*—Richard Weisberger

[57] ABSTRACT

A method of magnetically fabricating a particle filled polymer having improved mechanical, electrical, or thermal surface characteristics. Finely divided ferrite particles are first mixed into a hardenable, liquid polymeric material. Next, the particles are magnetically oriented within the material along a selected pattern characterized by a gradient of increasing particle density toward a surface of the material. The polymeric material is then cured into a hardened state in order to affix the pattern of particles therein. The particles may be coated with a hardening material, such as diamond, and attracted to the surface of the material in order to impart desired wear and erosion resistance to the resulting composite. Alternatively, the particles may be coated with a electrically or thermally conducting material, such as silver, and magnetically pulled into intimate contact with one another to impart a high level of electrical or thermal conductivity to the resulting composite. The large particulate surface area provided by the magnetically obtained particle contact allows high levels of electrical or thermal conductivity to be obtained with the mixing of only small amounts of particulate matter to the polymer.

32 Claims, 6 Drawing Sheets

METHOD OF MAGNETICALLY FORMING A PARTICLE FILLED POLYMER HAVING ENHANCED MATERIAL CHARACTERISTICS

BACKGROUND OF THE INVENTION

This invention generally relates to polymer composites, and is specifically concerned with a method of magnetically orienting a particle filler in a polymer for improving the mechanical, electrical, or thermal properties of the resulting composite.

Polymeric materials offer substantial cost, weight, and corrosion resistance advantages over metals, but at the same time do not provide the mechanical, electrical, or thermal properties that many engineering applications require. In order to modify the physical properties of polymeric materials so that they may be used as substitutes for metal, a substantial development effort has been directed toward the coating of polymers with metals. Unfortunately, the coating materials available, the thickness limitations and the generally poor coating-to-polymer interface properties significantly restrict the use of any such coated polymer in an industrial application. For example, when a polymeric material is nickel coated via an electro-forming or nickel spray operation, some enhancement of wear properties is achieved, but the integrity of the nickel to polymer interface degrades rapidly causing the metal shell to pull away from the polymer substrate. While it may be possible to substantially improve the surface hardness of a polymeric tool by coating its exterior with diamond, no known polymer can tolerate the high temperatures needed to deposit such a coating.

While it is also known to mix metallic particles into a polymeric material in order to obtain an electrically or thermally conductive composite, such prior art techniques also have their shortcomings. Specifically, it is necessary for the particulate fill material to constitute a large weight percentage of the resulting composite (i.e., on the order of 85%) to achieve the desired electrical or thermal conducting properties. Unfortunately, such a high weight percentage of particle fill material not only jeopardizes the integrity of the polymeric matrix that surrounds the particles, but also renders the use of many desirable particulate materials prohibitively expensive. For example, while the use of silver particles in a polymeric solder joint can create a highly conductive joint, such a silver-filled polymeric material is over 1,000 times as expensive as a lead filled polymeric material. Similarly, in order to effectively "tag" a polymeric article (such as an underground pipe) so that it can be detected by a metal detector or ground penetrating radar, it has been necessary to impregnate at least selected portions of the article with a high-weight percentage of detectable metallic particles. While it may be possible to reduce the weight percentages of particles necessary to render such articles visible to conventional detecting equipment by adhering such particles in the form of a thin metal foil over the surface of the polymer, such foils are vulnerable to damage from abrasion or corrosion.

Clearly, there is a need for a method of fabricating an improved polymeric composite which is capable of having improved mechanical, electrical, or thermal surface properties which does not rely upon a surface coating of a metal over a polymeric core, or a particulate filling material that must constitute a high weight percentage of the resulting composite. Ideally, the improved polymeric composite would require the mixture of only a small weight percentage of particulate matter into the polymeric matrix in order to achieve the desired improvement of mechanical, electrical, or thermal properties. Finally, it would be desirable if the distribution of the particulate matter within the composite could be arranged in relatively complex patterns characterized by varying particle densities so that the resulting composite could be used to fabricate relatively complex mechanical, electrical, or thermal articles.

SUMMARY OF THE INVENTION

Generally speaking, the invention is a method of magnetically fabricating a particle filled polymeric material that overcomes or at least ameliorates all of the shortcomings associated with the prior art. In the method of the invention, finely divided magnetic particles are first mixed into a hardenable, liquid polymeric material. Next, the particles are magnetically oriented within the material along a selected pattern, which is typically a gradient of increasing particle density toward the surface of the material. Finally, the polymeric material is cured into a hardened state to affix the pattern of particles within it.

Depending upon the specific composition of the magnetic particles, the thus formed polymeric composite may have enhanced mechanical, electrical, or thermal properties. For example, if enhanced wear or erosion resistance of the resulting composite is desired, the magnetic particles may be formed from a diamond-coated ferrite or a magnetic ceramic material. The gradient-type integration of the particles near the surface of the polymer creates a secure bond between the polymer and the particles which results in a substantially hardened surface with the addition of only a small amount of particulate material (i.e., 5 weight percent or less) and which avoids the kind of sharp interfaces between polymers and surface coatings which have been problematical in the past. Such a composite may be used to manufacture lightweight, low cost machine tools and hardware components.

If enhanced electrical or thermal properties of the composite are desired, magnetic particles coated with electrically or thermally conductive metals (such as silver, copper, or gold) are mixed into the polymer while it is in liquid form. Magnets are then used to create a pattern of particles which includes at least one zone of particles in intimate contact with one another. As such a zone of intimately contacting, metal coated particles creates a large surface area for the conduction of either electricity or heat, the resulting polymeric composite is capable of conducting a large flow of either electricity or heat with only a relatively small amount of particulate filling material (i.e. less than 5 percent by weight of the composite). Such a composite polymeric material may advantageously be used to create highly conductive but relatively inexpensive solder joints, utilizing gold or silver plated magnetic particles. Such a composite may be used to create strain gauges wherein the conductivity of the composite greatly changes upon the application of a strain thereon which interferes with the intimate relationship of the metal plated particulate fill. Since the magnetic field used to orient the particles can be shaped into relatively complex patterns, the particulate filling may also be used to form electrical components with relatively complex structures, such as the stator and rotor of a motor, or printed circuit boards. In thermal applications, such a composite may advantageously be used to create highly efficient, yet inexpensive heat sinks.

In the preferred method of the invention, magnetic particles such as ferrite particles having an average diameter of no more than about $10^{-7}$ meters, and most preferably $10^{-8}$ meters, are mixed into the hardenable polymer, while it is in a liquid state. Such ferrite particles may be conveniently derived from lignosulfonate, and should form less than 5 weight percent of the particle fill polymer, and even more preferably less than 3 weight percent. A magnetic field is then applied to the mixture to orient the particles in a desired pattern, which may be a gradient of increasing particle density toward one or more surfaces of the polymer. The polymer is then allowed to harden, which in turn affixes the particle pattern in a polymeric matrix.

The large surface area provided by a zone of such particles in intimate contact minimizes the amount of particle fill needed in the composite polymer in order to achieve surface hardness or high levels of electrical or thermal conductivity. Moreover, the necessity for only a relatively small weight percentage of particulate fill does not allow the particulate matter to significantly undermine the integrity of the polymer matrix, and allows the use of relatively expensive particulate materials.

The invention encompasses not only a method of magnetically fabricating a particle filled polymer, but the articles produced by the methods as well, since each such article includes a unique, gradient-type pattern of magnetic particles from the magnetic fields used to create the particulate distribution.

BRIEF DESCRIPTION OF THE SEVERAL FIGURES

FIG. 1 schematically illustrates a vessel containing a liquid polymer having magnetic particles uniformly mixed throughout;

Figure 12A:
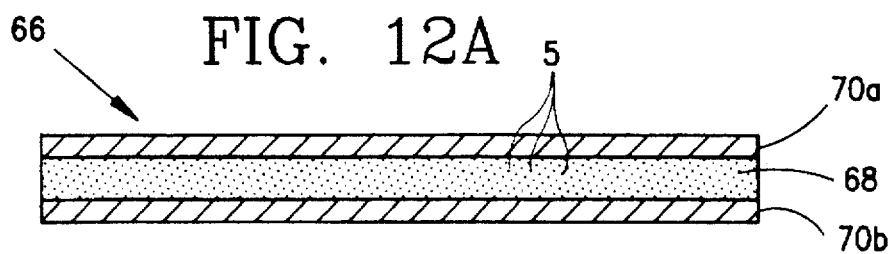
Figure 12B:
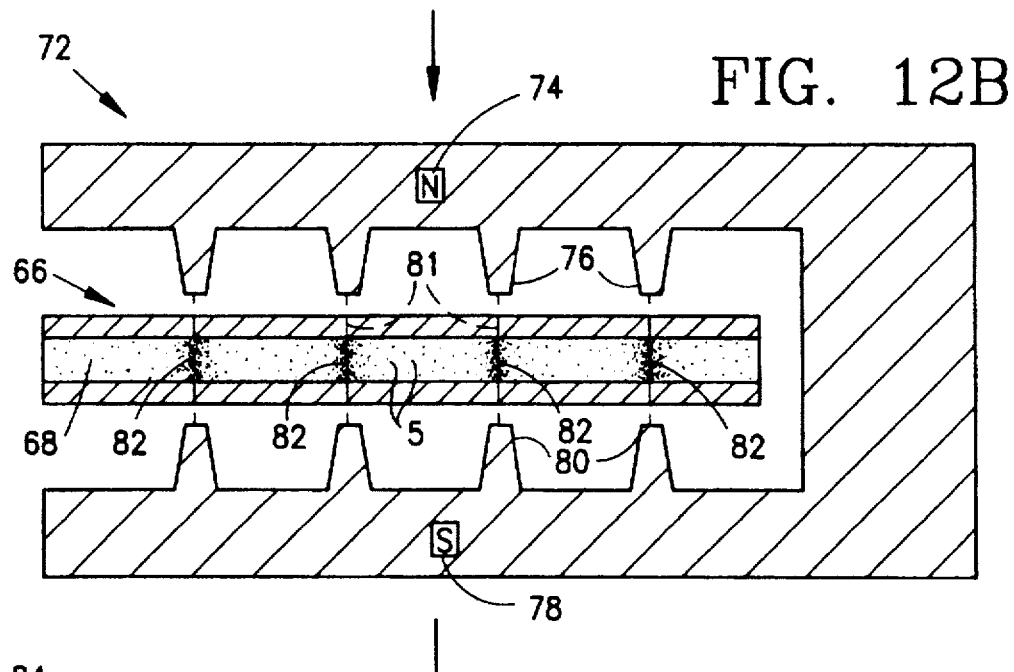
Figure 12C:
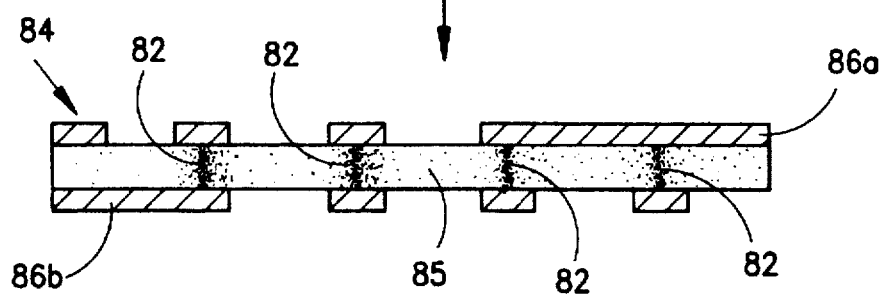
Figure 13:
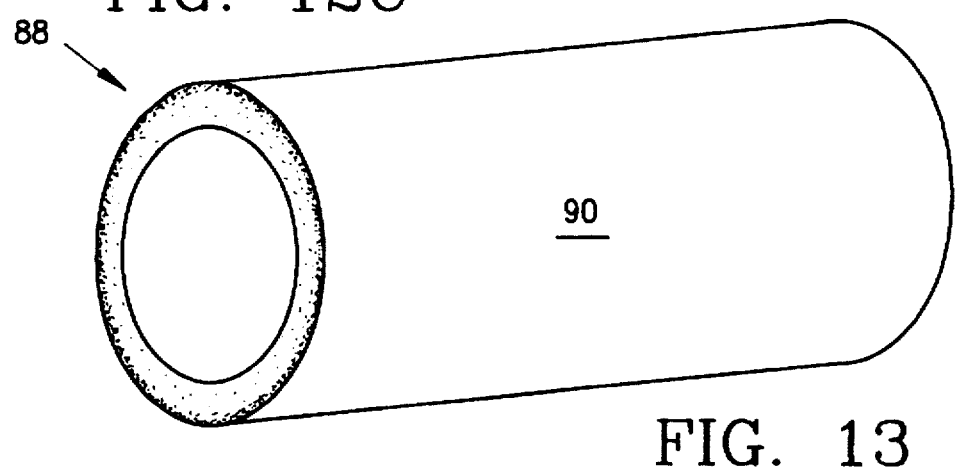
Figure 14A:
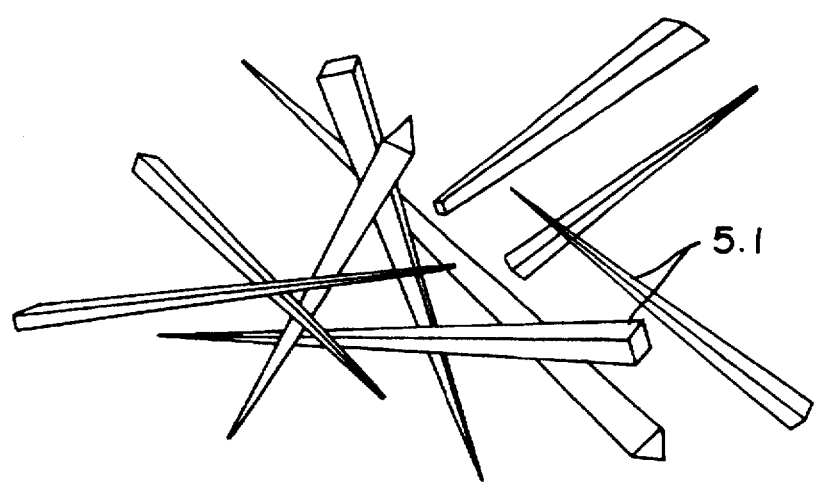
Figure 14B:
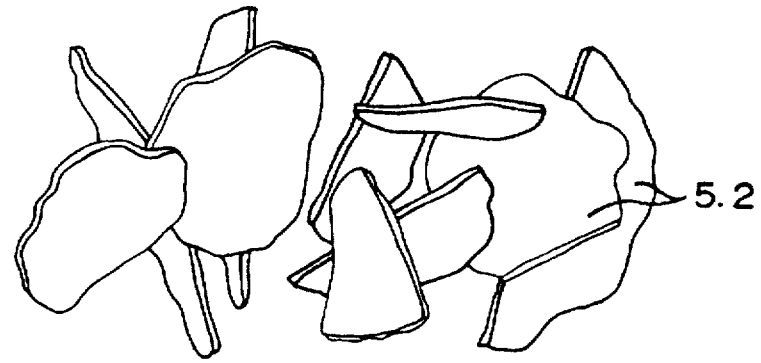
Figure 14C:
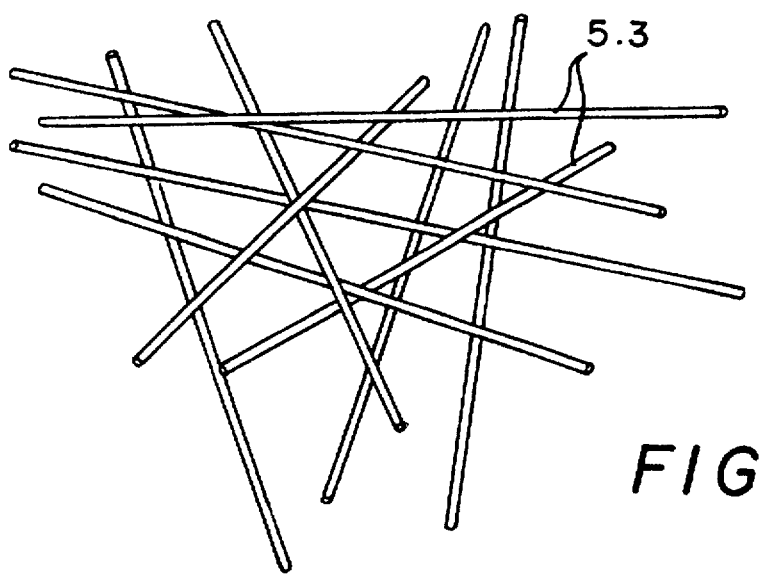

FIGS. 12A, 12B, and 12C are cross-sectional views of a circuit board whose internal conductive paths are made in accordance with the method of the invention;

FIG. 13 is a perspective view of a conduit designed for underground use that contains a layer of tagging particles formed in accordance with the method of the invention to render the pipe perceptible to ground-penetrating radar, and FIGS. 14A, 14B, and 14C illustrate needle-shaped, flake-like and rod-shaped particles that can be used in the method of the invention.

DETAILED DESCRIPTION OF THE PREFERRED EMBODIMENT

Figure 1:
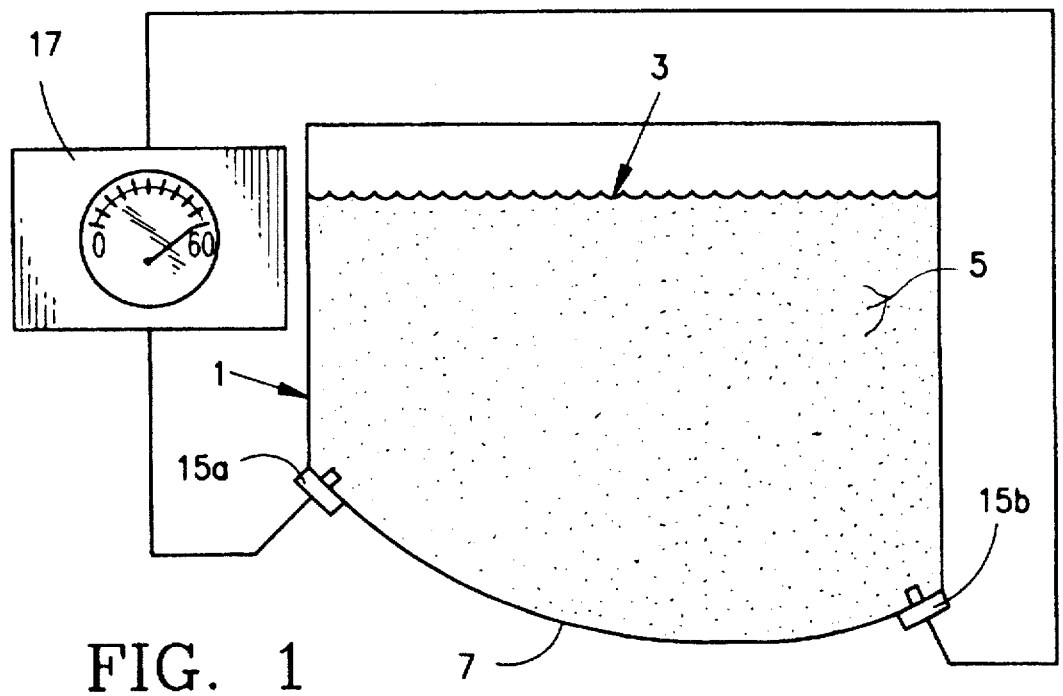
Figure 2:
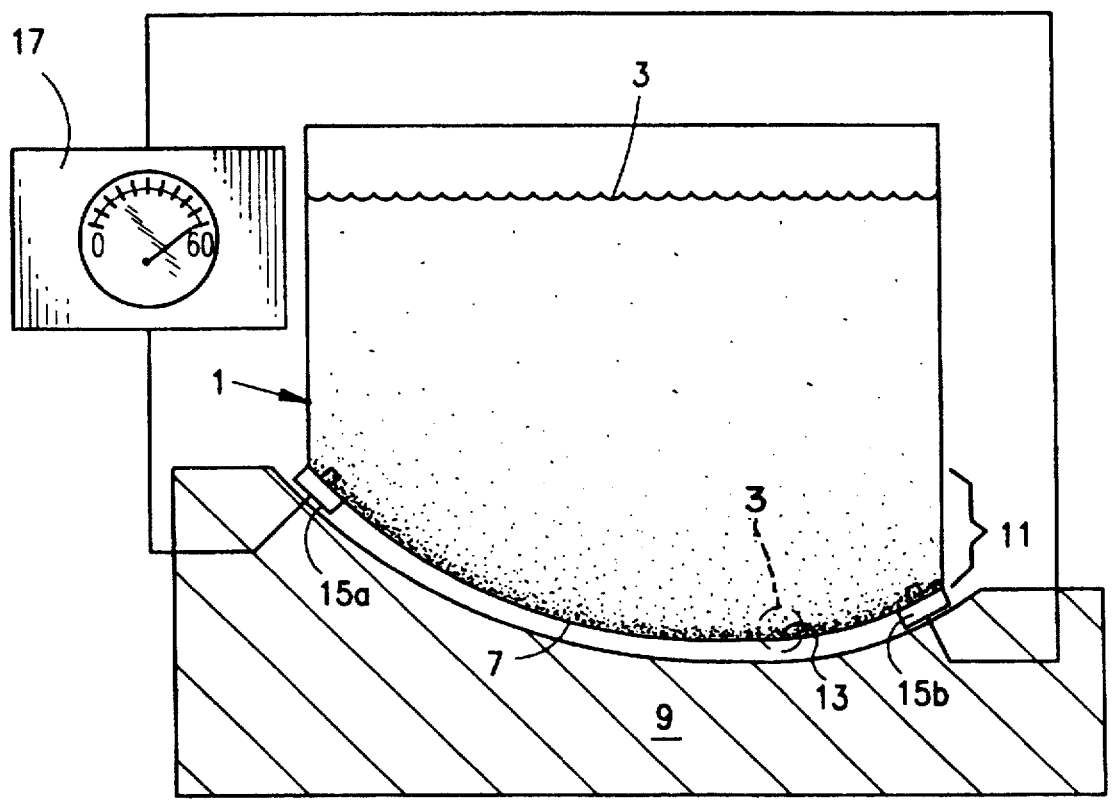
FIG. 2 illustrates the application of a magnetic force to the polymer-particle mixture of FIG. 1, and how it creates a gradient of particle density near the surface of the polymer.

With reference to FIGS. 1 and 2, wherein like numerals designate like components throughout all of the several figures, the method of the invention is implemented by means of a vessel 1 that contains a hardenable polymer 3 into which magnetic particles 5 have been mixed. The liquid polymer may be any one of a number of materials commonly used to form plastics, including but not limited to polyethylenethalate, polypropylene, polyacrylate, polybutalene, polyvinyle chloride, phenolic resins, ultra-violet curable epoxys, or silicones. The magnetic particles 5 are most preferably formed from ferrite particles derived from an aqueous colloidal solution of ferromagnetic iron lignosulfonate. Particles so derived typically have an average diameter of $10^{-8}$ meter, which is advantageously less than the diameter of a single magnetic domain. Consequently, while they may be magnetically manipulated, they will carry no residual magnetic field once the manipulating field has been removed. While such particles have a spinel crystal structure and are typically composed of magnetite, their composition is more generally described by the formula $XFe_2O_4$ where X equals any divalent metal ion whose size fits into the spinel crystal structure.

To implement the method of the invention, a surface 7 of the vessel 1 is placed in close proximity to a magnet 9. The magnet may be a permanent magnet, an electromagnet, flexible vinyl magnet which advantageously can conform to the contour of a curved surface such as surface 7.

Figure 3:
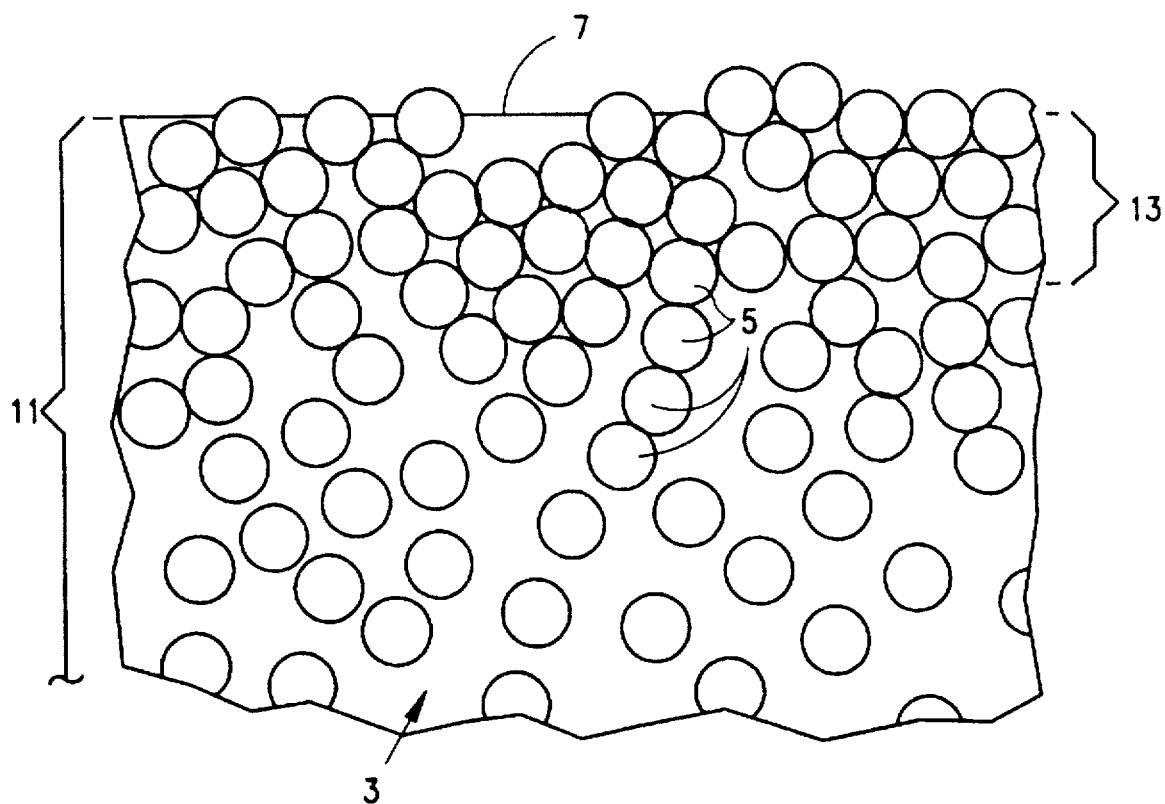
FIG. 3 is an enlargement of the portion of the polymer composite contained within the circle 3 of FIG. 2.

When the magnetic particles 5 are exposed to the field emanated by the magnet 9, they are drawn toward the surface 7 and are distributed along a gradient 11 of ever increasing density. If the field emanated by the magnet 9 is sufficiently strong, the magnetic particles 5 are gathered into a layer 13 along the surface 7 of the polymer in which adjacent particles 5 come into intimate contact with one another at one or more points. Such a surface layer 13 is best seen with respect to FIG. 3. The very small average diameter of the particles 5 (circa $10^{-8}$ meter) coupled with the point contact that adjacent particles have with one another in the layer 13 imparts a very high surface area to the layer 13. Such a structure is highly advantageous for the conduction of either electricity or heat, as the transmission of these energies occurs largely through the surface of the conductor, rather than through its interior. The inherently large surface area of the layer 13 of intimately contacting particles 5 obviates the need for large percentages of particle fill to attain high degrees of electrical or thermal conductivity. Hence, a composite polymer wherein the particulate filler forms only about 5 weight percent of the total composite can have a thermal or electrical conductivity equivalent to a prior art composite polymer having an 85 weight percent content of particles which are not magnetically arranged in such an intimately contacting layer 13.

The electrical conduction property of such a layer 13 is schematically illustrated in FIGS. 1 and 2, wherein a pair of electrodes 15a,b has been mounted at either end of the surface 7 and electrically connected across an ohmmeter 17.

In FIG. 1, wherein the particles 5 are uniformly distributed throughout the polymer 3, the resistance across the electrodes 15a,b is essentially infinite. However, where the particles 5 have been drawn into a surface layer 13 as previously described, the electrical resistance across the surface 7 can fall to essentially zero (assuming that the particles 5 are either formed from or at least coated with an electrically conductive material such as silver, gold, or copper). Interestingly, if the polymer 3 is never cured into a hardened state, FIGS. 1 and 2 illustrate how the method of the invention may be used to form a switch which becomes closed upon the application of a magnetic field, but open again as soon as the magnetic field is removed and the particles 5 are allowed to migrate away from the surface 7.

Figure 4A:
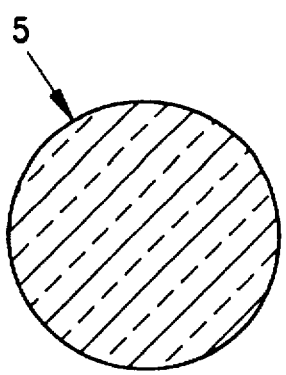
FIG. 4A is a cross-sectional view of a ceramic magnetic particle of a type which may be used to enhance abrasion resistance on the surface of a polymeric articles.
Figure 4B:
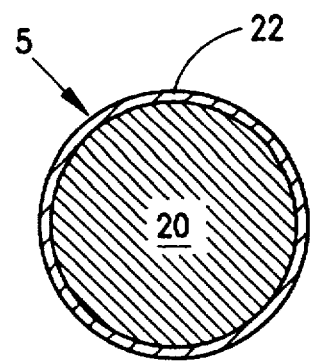
FIG. 4B is a cross-sectional view of a magnetic particle having an exterior coating (i.e., diamond, gold, silver) for imparting a desired characteristic to the resulting polymeric composite.

FIGS. 4A and 4B illustrate examples of magnetic particles which may be used in connection with the instant method. If the object of the method is to improve the surface hardness or erosion resistance of the resulting composite article, a particle 5 formed from a magnetic ceramic such as barium ferrite may be used. Such a magnetic particle is illustrated in cross-section in FIG. 4A. Alternatively, as shown in FIG. 4B, a particle 5 may be used that is formed from a core 20 of metallic ferrite covered with a layer 22 of some sort of hardness or conductivity enhancing material. For example, the layer 22 may be a layer of diamond if the object of the method is to increase the surface hardness or erosion resistance of the resulting composite article. Alternatively, the layer 22 may be a layer of silver, gold, or copper if the object of the method is to produce an electrical or thermally conductive composite article. The use of a coated particle 5 such as that illustrated in FIG. 4B is particularly advantageous in a case where the property enhancing material (diamond, gold, or silver) is expensive, since it minimizes the amount of such materials needed in order to impart the desired amount of hardness or conductivity to the resulting composite. Although not specifically shown in any of the several figures, magnetic ceramic particles such as that illustrated in FIG. 4A may also be coated with diamond to further enhance the hardness of the resulting particle, or even conductive metal such as gold, silver, or copper if the end objective is to produce an electrically or thermally conductive composite article.

Figure 5:
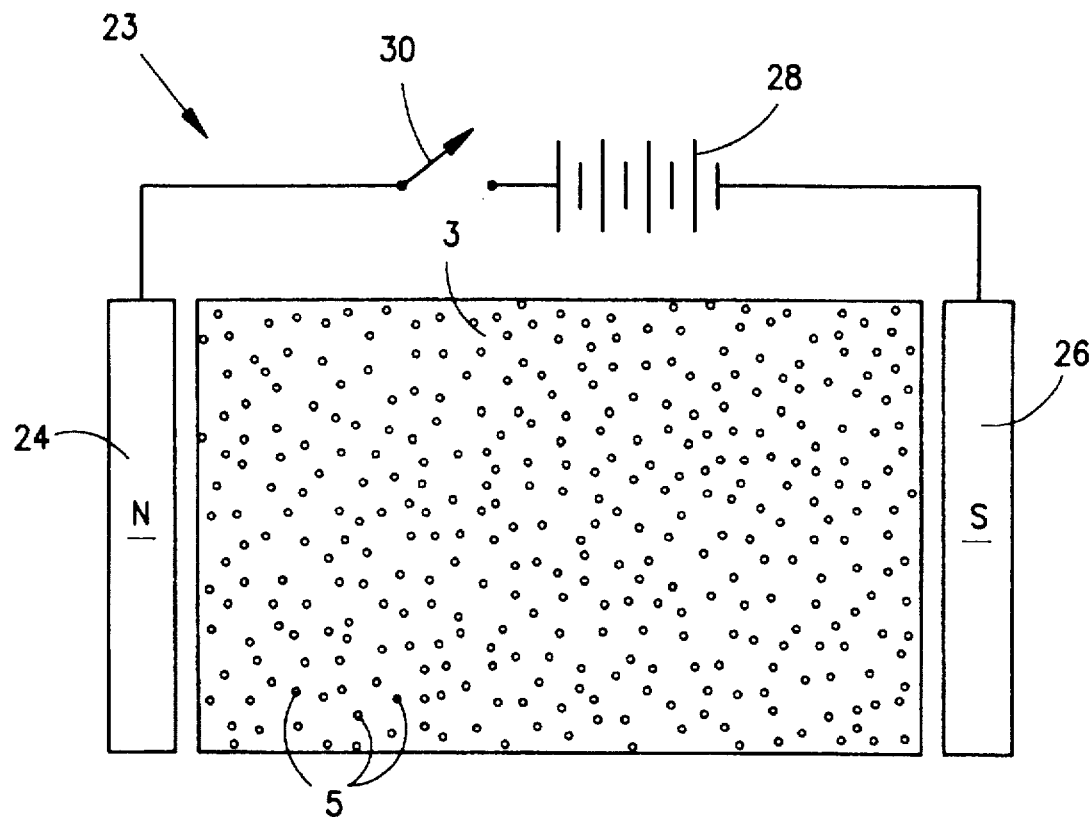
FIG. 5 is a plan view of a liquid polymer containing magnetic particles that is disposed between the poles of an electromagnet.
Figure 6:
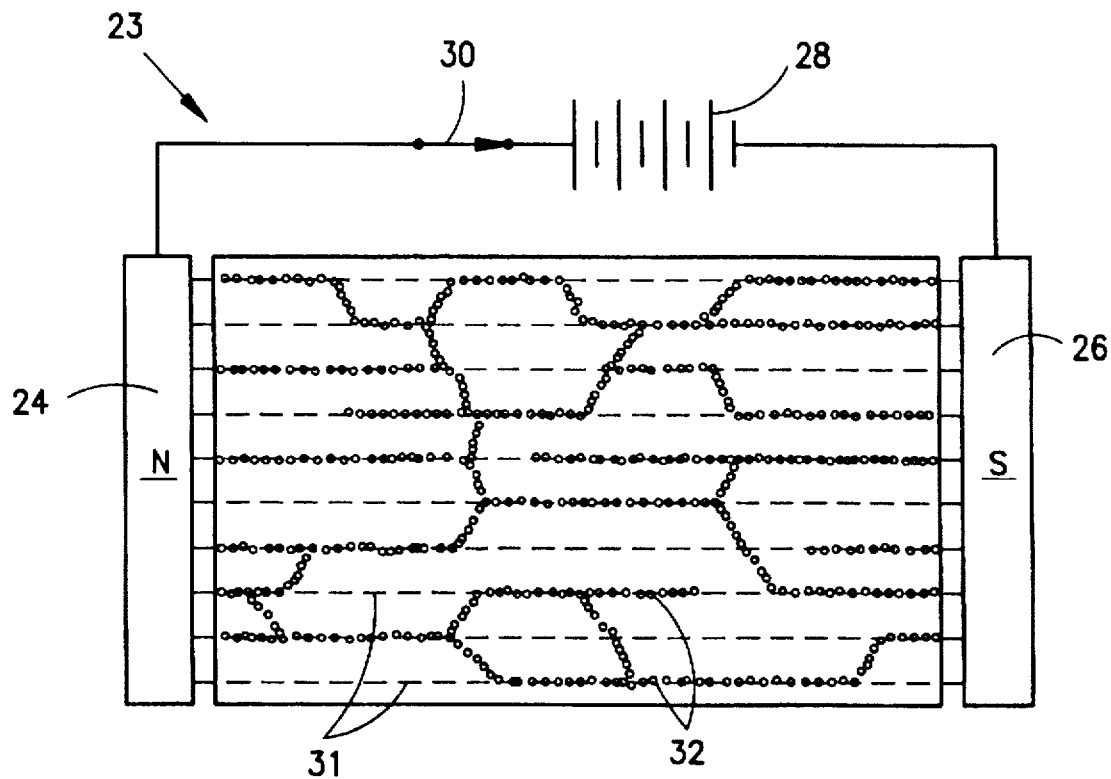
FIG. 6 illustrates how the conductive particles in the composite of FIG. 5 arrange themselves in conductive strands upon the actuation of the electromagnet.

FIGS. 5 and 6 illustrate another way by which the method of the invention can create an electrical or thermally conducting path in a polymer composite. In FIG. 5, a mixture of liquid polymer 3 and magnetic particles 5 is disposed between the poles 24,26 of an electromagnet powered by a DC source 28. When the switch 30 is closed and the poles 24,26 of the electromagnet 23 are actuated, the magnetic particles 5 line up along the lines 31 of the resulting magnetic flux, creating a plurality of interconnecting conductive strands 32 throughout the matrix of polymer 3. This particular variation of the method may be combined with the method of the invention illustrated in FIGS. 1 and 2 by positioning still another magnet (not shown) in plan over the mixture of polymer 3 and magnetic particles 5 illustrated in FIG. 6. The magnet positioned in plan over the liquid polymer will tend to draw the magnetic particles 5 into an intimate layer such as that described with reference to FIG. 3, while the lines of magnetic flux 31 superimpose a network of conductive strands through the layer 13.

Figure 7:
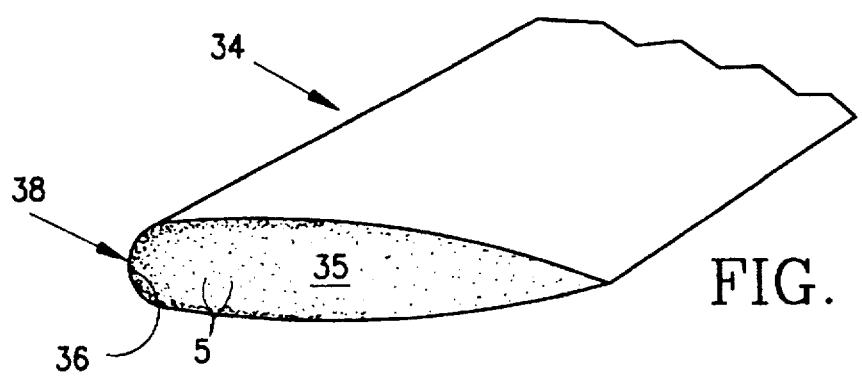
FIG. 7 is a cross-section perspective view of a polymeric propeller whose leading edge has been strengthened by a magnetically formed layer of erosion resistant magnetic particles.

FIGS. 7 through 13 illustrate various articles which may be advantageously produced by the method of the invention. FIG. 7 illustrates a cross-section of a propeller 34 of the type which may be used in an energy-generating windmill. When such propellers are formed entirely from polymeric materials, they suffer erosion on their leading edges as a result of wind abrasion. However, when such a propeller 34 is formed from a polymeric body 35 that has been admixed with magnetic particles 5 in its liquid state and subjected to magnetic forces in the vicinity of its leading edge 38, a protective layer 36 of magnetic particles (which are formed from abrasion-resistant materials or coated with such) is formed around the inside of the edge 38. The structure of the protective layer 36 is the same as that described with respect to FIG. 3.

Figure 8:
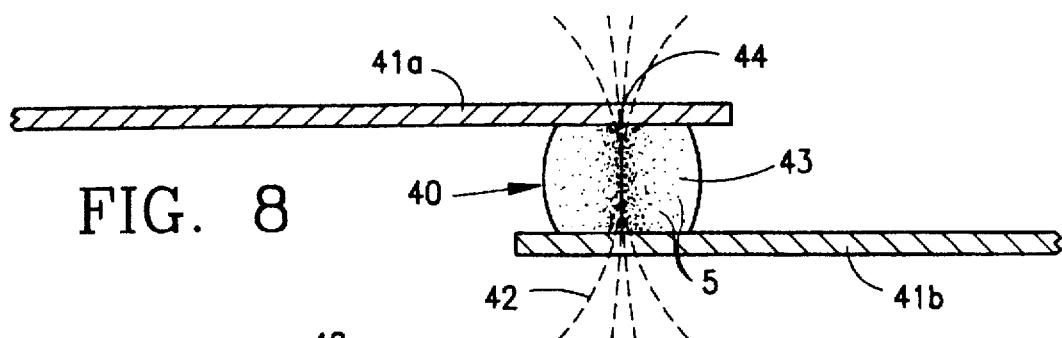
FIG. 8 is a cross-sectional side view of a solder joint formed by the polymeric composite of the invention.

Turning now to FIG. 8, the method of the invention may also be used to form a composite solder joint 40 that mechanically and electrically interconnects metallic connectors 41a,b. Such a joint 40 is formed by placing a mixture of hardenable polymer 3 and magnetic particles 5 between the metallic connectors 41a,b. A magnetic field 42 is then applied on either side of the metallic connectors 41a,b to draw the magnetic particles into a tight cylindrically-shaped structure extending through the center of the joint 40. The joint 40 is then allowed to harden (by, for example, air curing, exposure to ultraviolet light, etc.) into the shape illustrated in FIG. 8. The large surface area of the cylindrical configuration of intimately contacting particles 5 encased within the resulting polymeric matrix 43 creates the electrical equivalent of a broad conductive strand 44 of wire through the center of the joint 40.

Figure 9:
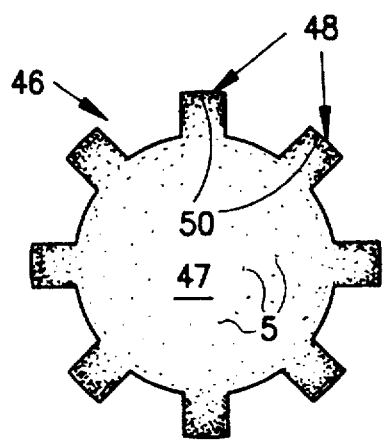
FIG. 9 is a schematicized, plan view of the rotor of a stepping motor made in accordance with the method of the invention.

FIG. 9 illustrates how a rotating electrical component such as an armature 46 of a stepper motor may be created by the method of the invention. Such an armature 46 is comprised of a rotatable body 47 having a plurality of uniformly spaced poles 48 around its circumference with are magnetically attractable. Magnetizable particles 5 are mixed into the material forming the body 47 and a plurality of magnets (not shown) are disposed around the poles 48 when the polymer is still in its liquid state in order to create magnetic layers 50 at the end of each of the poles 48. The polymer forming the armature body 47 is then hardened to secure the particles 5 into the position shown.

Figure 10:
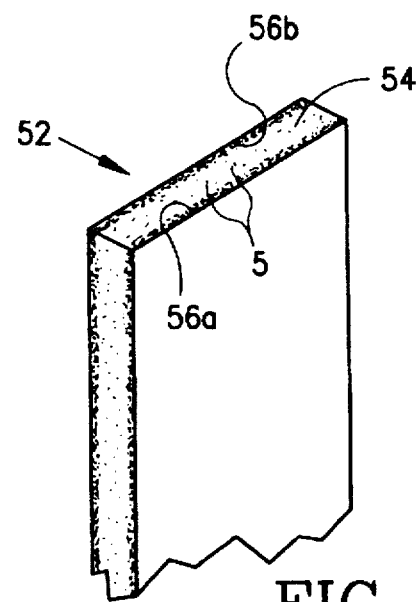
FIG. 10 is a perspective view of a heat sink made in accordance with the method of the invention.

FIG. 10 illustrates a heat sink 52 made in accordance with the method of the invention. In this particular application of the method, a mixture of liquid polymer and magnetizable particles 5 are placed into a mold that imparts a fin-like shape to the resulting heat sink 52. Magnets (not shown) are applied on either side of the fin-like shape when the polymer is still in its liquid state in order to create a pair of thermally conductive layers 56a,b on either side of the sink 52. The polymer is then allowed to harden in order to retain the magnetic particles 5 in the layers 56a,b shown.

Figure 11:
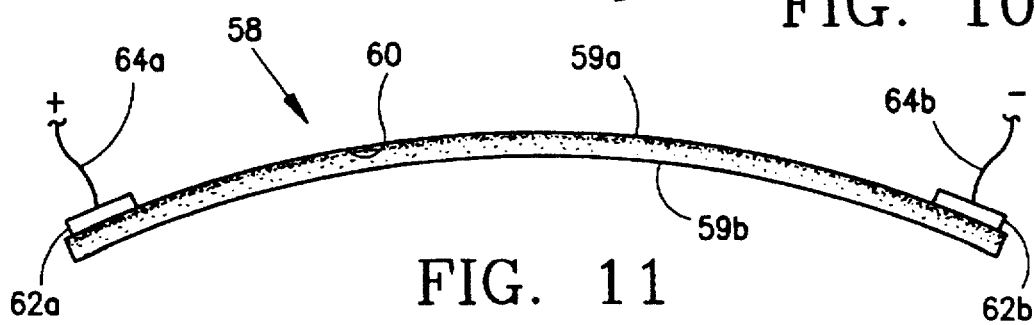
FIG. 11 is a cross-sectional view of a strain gauge made in accordance with the method of the invention.

FIG. 11 illustrates a strain gauge made in accordance with the method of the invention. This particular application of the invention is similar to that described with respect to the heat sink of FIG. 10, with the exception that magnets are applied on only one side 59a of the gauge 58 when the polymer is still in its liquid state in order to create only a single conductive layer 60 of particles on the upper side 59a of the gauge 58. Electrodes 62a,b are connected on either end of the gauge 58 in contact with the conductive layer 60. When the strain gauge 58 is bent as shown, gaps are created between the magnetic particles 5 forming the conductive layer 60, which in turn measurably increases the resistance to the current applied to the layer 6 via electrodes 62a,b. The increase in resistance is proportional to the amount of strain (bending) that the strain gauge is subjected to.

FIGS. 12A, 12B, and 12C illustrate how the method of the invention may be used to manufacture a printed circuit board. In the first step of this particular variation of the method, a circuit board blank 66 comprised of a layer of liquid polymer 68 mixed with magnetic, electrically conductive particles 5 is sandwiched between a pair of copper sheets 70a,b, as indicated in FIG. 12A. Next, the circuit board blank 66 is subjected to a patterned magnetic field from electromagnets 72 as shown in FIG. 12B. Such an electromagnet 72 includes north and south poles 74,78, each of which has its own array of focusing projections 76,80, respectively. Lines of magnetic flux are focused and hence concentrated between the two sets of opposing projections 76,80, which in turn creates conductive stands 82 of intimately connected particles 5 along the flux lines 81 in the same manner as described with respect to solder joint 40. In the last step of this particular variation of the method, illustrated in FIG. 12C, the top and bottom sheets 70a,b are etched to form patterned conductive sheets 86a,b which are interconnected at selected points by conductive strands 82 formed from the magnetic particles 5.

FIG. 13 illustrates how an underground conduit 88 which is perceptible by ground penetrating radar may be made in accordance with the method of the invention. The pipe 50 is initially extruded from a mixture of liquid polymer and magnetic particles. Immediately after the extrusion of the conduit 88, the exterior of the tubular body 90 is uniformly subjected to a magnetic field around its circumference. This field creates a layer of intimately contacting magnetic particles 92 around the outer surface of the conduit 88 which, while extremely thin, is just as visible to a ground penetrating radar as a conduit wrapped with foil many times thicker than the layer 92. Moreover, because the layer 92 is formed from magnetic particles 5 encased within an inert, non-corrosive polymeric matrix, the layer 92 is immune to corrosion, and is far less apt to damage from the application of external abrasions or mechanical shock to conduit 88.

Finally, FIGS. 14A,B, and C illustrate needle-shaped, flake-shaped, and rod-shaped particles 51,52, respectively, that can be used in the method of the invention. In all cases, the aspect ratios of length to width should be at least 10 to 1 to increase the surface area to volume ratio and hence the ability of contacting clusters or strands of such particles to conduct electricity or heat. The high aspect ratio also reduces the migration time for the particles to become properly oriented in the polymeric matrix, and provides better erosion-resistant surfaces than round particles since the elongated bodies of such particles are inherently better anchored within the surrounding polymeric matrix than round particles. In addition to ferrite, such particles may be formed from iron, steel, or virtually any magnetic alloy. The smallest dimension of such elongated or flake-like particles should also be about $10^{-8}$ m to insure a high degree of integration between the particles and the surrounding polymeric matrix where the particles are concentrated.

What is claimed:

1. A method of fabricating a particle filled polymer, comprising the steps of:

mixing magnetic particles into a hardenable, liquid polymeric material;

magnetically orienting said particles within said material along a selected pattern, and curing said polymeric material into a hardened state to affix said pattern of particles within said material.

2. The method as defined in claim 1, wherein said pattern of particles includes a gradient pattern of increasing particle density in a selected portion of said material.

3. The method as defined in claim 2, wherein said gradient pattern of particles is oriented along a surface of said hardened polymeric material to modify the surface properties of said material in accordance with physical properties of said particles, the amount of modification being dependent upon the density of particles in the vicinity of said surface.

4. The method as defined in claim 3, wherein said pattern of particles substantially increases the wear and erosion resistance of the surface of the material.

5. The method as defined in claim 2, wherein said pattern of particles substantially increases the electrical conductivity of the surface of the material.

6. The method as defined in claim 2, wherein said pattern of particles substantially increases the thermal conductivity of the surface of the material.

7. The method as defined in claim 4, wherein said magnetic particles are coated with a layer of diamond.

8. The method as defined in claim 4, wherein said magnetic particles are formed from a ceramic material.

9. The method as defined in claim 4, further comprising the step of molding said hardenable, liquid polymeric material into an article of erosion and wear resistant hardware prior to the step of curing the polymeric material.

10. The method as defined in claim 5, wherein said magnetic particles are coated with a metal selected from the group consisting of silver, copper, and gold, and wherein said pattern of particles includes a group of particles in intimate contact with one another.

11. The method as defined in claim 6, wherein said particles are coated with metal selected from the group consisting of copper, silver, and gold, and wherein said gradient pattern of particle density includes a zone of particles in intimate contact with one another.

12. The method as defined in claim 1, wherein said magnetic particles are less than about $10^{-7}$ meters in diameter.

13. The method as defined in claim 1, wherein said magnetic particles are formed from finely divided ferrite.

14. The method as defined in claim 13, wherein said ferrite magnetic particles are derived from lignosulfonate.

15. The method as defined in claim 10, wherein said hardenable, liquid polymeric material is molded into the shape of a piece of rotatable hardware prior to the step of magnetically orienting said particles within said material.

16. The method as defined in claim 10, further comprising the step of forming said hardenable, liquid polymeric material into an electrically conductive adhesive joint prior to curing said polymeric material.

17. The method as defined in claim 10, further comprising the step of forming an electrical device component from said hardenable, liquid polymeric material prior to curing said polymeric material.

18. The method as defined in claim 10, further comprising the step of forming said hardenable, liquid polymeric material into a displacement sensor whose electrical conductivity changes as a function of strain applied to the sensor.

19. The method as defined in claim 10, further comprising the step of forming a circuit board from said hardenable, liquid polymeric material prior to curing said polymeric material, wherein said pattern of particles form electrical connections throughout said board.

20. The method as defined in claim 11, further comprising the step of molding said hardenable, liquid polymeric material into a heat sink prior to curing said polymeric material.

21. The method as defined in claim 13, wherein said pattern of magnetically oriented ferrite particles forms a group of particles capable of being detected by a fluctuating electromagnetic field.

22. The method as defined in claim 1, wherein said magnetic particles form no more than about 5% by weight of said particle filled polymeric material.

23. The method as defined in claim 22, wherein said magnetic particles form no more than about 3% by weight of said particle filled polymeric material.

24. The method as defined in claim 1, wherein said magnetic particles have an average diameter of about $10^{-8}$ m.

25. A method of fabricating a composite polymeric material having modified surface properties, comprising the steps of:

mixing magnetic particles having a diameter of $10^{-7}$ m or less into a hardenable, liquid polymeric material;

magnetically orienting said particles within said polymeric material in a pattern that includes a gradient of increasing particle density toward a surface of said material, and curing said polymeric material into a hardened state to affix said pattern of particles within said material.

26. The method defined in claim 25, wherein said particle pattern includes at least one zone wherein said particles are in intimate contact with one another.

27. The method defined in claim 25, wherein said magnetic particles are ferrite particles.

28. The method defined in claim 25, wherein said magnetic particles constitute less than 5% of the net weight of the composite.

29. A method of fabricating a particle filled, solid material, comprising the steps of mixing magnetic particles into a hardenable, liquid material;

magnetically orienting said particles within said material along a selected pattern, and hardening said liquid material to affix said pattern of particles within said material.

30. The method defined in claim 29, wherein said pattern of particles includes a gradient pattern of increasing particle density in a selected portion of said material.

31. A method of fabricating a particle filled polymer, comprising the steps of:

mixing particles into a hardenable, liquid polymeric material, said particles being attractable by and movable by an externally applied force field;

applying an external force field to said mixture of particles and liquid polymeric material to orient said particles within said material in a selected pattern, and curing said polymeric material into a hardened state to affix said pattern of particles within said material.

32. The method defined in claim 31, wherein said pattern of particles includes a gradient pattern of increasing particle density in a selected portion of said material.

* * * * *